(12) United States Patent
Miura (10) Patent No.: US 7,917,263 B2
(45) Date of Patent: Mar. 29, 2011

(54) ACTIVATION SYSTEM AND METHOD FOR PASSENGER PROTECTION DEVICE

(75) Inventor: Hisanori Miura, Gamagori (JP)

(73) Assignee: Denso Corporation, Kariya (JP)

( * ) Notice: Subject to any disclaimer, the term of this patent is extended or adjusted under 35 U.S.C. 154(b) by 1102 days.

(21) Appl. No.: 11/656,162

(22) Filed: Jan. 22, 2007

(65) Prior Publication Data

US 2007/0170779 A1  Jul. 26, 2007

(30) Foreign Application Priority Data

Jan. 25, 2006  (JP) ................... 2006-016606

(51) Int. Cl.
*B60R 22/00* (2006.01)

(52) U.S. Cl. .............. 701/45; 701/36; 701/49; 180/271; 280/734

(58) Field of Classification Search ............. 701/34, 701/36, 45, 46, 47, 49, 213; 180/274, 282, 180/271; 280/734, 735; 307/10.1
See application file for complete search history.

(56) References Cited

U.S. PATENT DOCUMENTS

| | | | |
|---|---|---|---|
| 6,587,532 B1 | 7/2003 | Hermann | |
| 7,092,806 B2 | 8/2006 | Kumazawa et al. | |
| 2004/0004396 A1* | 1/2004 | Kumazawa et al. | 307/9.1 |
| 2004/0059487 A1 | 3/2004 | Lich et al. | |
| 2007/0124049 A1 | 5/2007 | Lich et al. | |
| 2010/0204766 A1* | 8/2010 | Zdeblick et al. | 607/119 |

FOREIGN PATENT DOCUMENTS

| | | |
|---|---|---|
| DE | 100 12 862 | 9/2001 |
| DE | 196 09 290 | 12/2002 |
| JP | 04-82348 | 3/1992 |
| JP | 09-223080 | 8/1997 |
| JP | 11-348715 | 12/1999 |
| JP | 2003-037637 | 2/2003 |
| JP | 2004-42897 | 2/2004 |
| JP | 2004-268719 | 9/2004 |
| JP | 2004-284382 | 10/2004 |
| WO | WO 97/15474 | 5/1997 |

OTHER PUBLICATIONS

Search Report dated Jan. 28, 2010 in corresponding French Application No. 0700527.
Office Action dated Jul. 2, 2007 in German Application No. 10 2006 060 079.7-21 with English translation thereof.
Office Action dated Aug. 17, 2010, in corresponding Japanese Application No. 2006-016606.

* cited by examiner

*Primary Examiner* — Gertrude Arthur Jeanglaud
(74) *Attorney, Agent, or Firm* — Harness, Dickey & Pierce, PLC

(57) ABSTRACT

An activation system for a passenger protection device comprises a pair of communication wires, a central unit for detecting currents flowing in the communication wires, and a satellite unit for varying the currents flowing in the communication wires based on output data of an acceleration detection sensor. The central unit calculates a sum of the detected currents and compares the sum with a first predetermined level to detect the output data of the sensor. The central unit also calculates a difference between the detected currents and compares the difference with a second predetermined level, thereby detecting failure in the communication wires and stopping activation of the passenger protection device.

14 Claims, 9 Drawing Sheets

ACTIVATION SYSTEM AND METHOD FOR PASSENGER PROTECTION DEVICE

CROSS REFERENCE TO RELATED APPLICATION

This application is based on and incorporates herein by reference Japanese Patent Application No. 2006-16606 filed on Jan. 25, 2006.

FIELD OF THE INVENTION

The present invention relates to activation system and method for a passenger protection device mounted on a vehicle, and more particularly to activation system and method for a passenger protection system in which a central unit and a satellite unit communicate by current through a communication line.

BACKGROUND OF THE INVENTION

In conventional vehicle airbag systems, collision detecting sensors are mounted at crash zones of a vehicle to accurately detect vehicle collision at the earliest time and activate the most appropriate one airbags. For instance, a collision detecting sensor for detecting a front collision is mounted on a radiator support member, collision detecting sensors for detecting side collisions are mounted on a pillar member or inside side doors. Those collision detecting sensors are incorporated in satellite sensor units, respectively. A central airbag electronic control unit (ECU) is provided to communicate with the satellite sensor units for receiving various data related to collisions such as acceleration data detected by the collision detecting sensors. Two communication methods are proposed for transmitting data from the satellite sensor unit to the airbag ECU. One method is a voltage transmission method, which changes a voltage on a communication line to represent digital data by logical "1" and "0." The other method is a current transmission method, which changes a current flowing in the communication line to represent digital data by logical "1" and "0" (for instance, U.S. Pat. No. 7,092,806 corresponding to JP 2004-34828A). The current transmission method is adopted more often in recent years.

Figure 9:
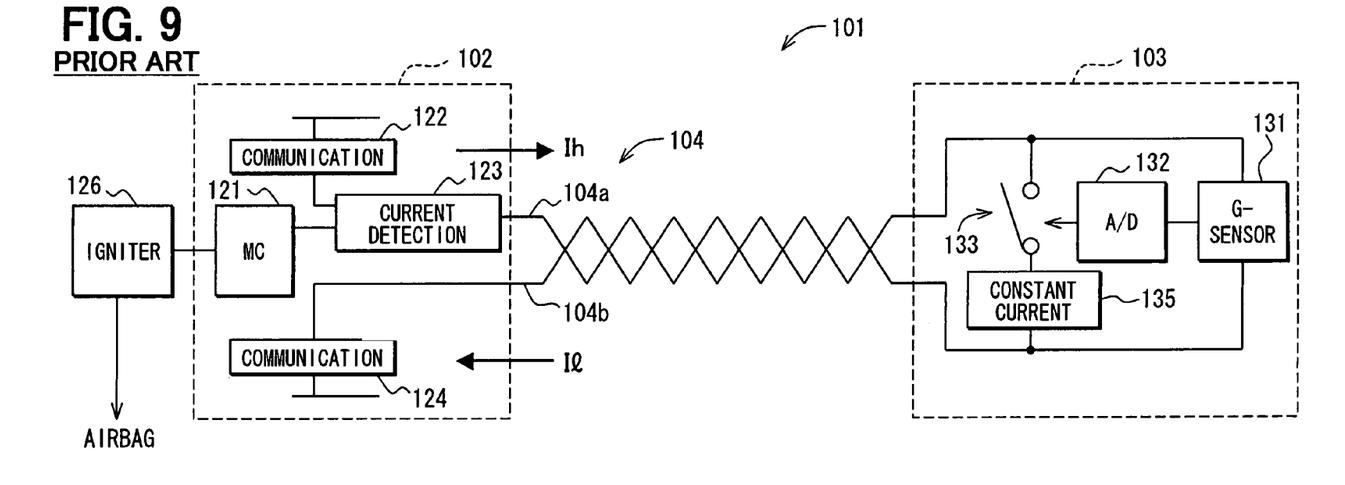
FIG. 9 is a block diagram showing a conventional airbag activation system.

One conventional airbag activation system is constructed as shown in FIG. 9 and denoted by reference numeral 101. This airbag activation system 101 includes a central airbag ECU 102, a collision sensor unit 103 and a communication line 104 connecting these two units 102, 103. The communication line 104 is a twisted-pair cable including two conductive wires 104a, 104b. The sensor unit 103 transmits data to the airbag ECU 102 through the communication line 104 in the current transmission method. Although not shown in the figure, the airbag ECU 102 is connected to a plurality of collision sensor units in the similar manner as the sensor unit 103 shown in the figure.

The sensor unit 103 includes a G-sensor 131, an analog/digital (A/D) converter 132, a communication switch 133 and a constant current circuit 135. The G-sensor 131 is an electronic acceleration sensor that detects acceleration (G) generated upon collision of a vehicle against an obstacle such as an on-coming vehicle and outputs an analog signal corresponding to the detected acceleration. The A/D converter 132 converts the analog signal of the G-sensor 131 to a corresponding digital signal. The communication switch 133 may be a semiconductor switching element provided between the communication wires 104a, 104b, so that it may be turned on and off when the digital signal of the A/D converter 132 is "1" and "0", respectively. The constant current circuit 135 is also provided between the communication cables 104a, 104b in series with the communication switch 133 to supply a constant current. When the communication switch 133 is turned on, the constant current supplied by the constant current circuit 135 flows in a direction indicated by arrows in FIG. 9. When the communication switch 133 is turned off, on the other hand, the constant current does not flow.

The airbag ECU 102 is an electronic control unit that determines vehicle collision based on data received from each sensor units 103 through the communication line 104, and controls activation of an airbag. The airbag ECU 102 includes a microcomputer 121, a communication circuit 122 connected to the communication wire 104a, a current detection circuit 123 and a communication circuit 124 connected to the communication wire 104b. The current detection circuit 123 is for detecting a current flowing in the communication line 104. The communication circuits 122, 124 are for transmitting signals from the airbag ECU 102 to the sensor unit 103. Although not shown in the figure, the current detected by the current detection circuit 123 is transmitted to the microcomputer 121 through a serial peripheral interface (SPI) circuit.

Figure 10:
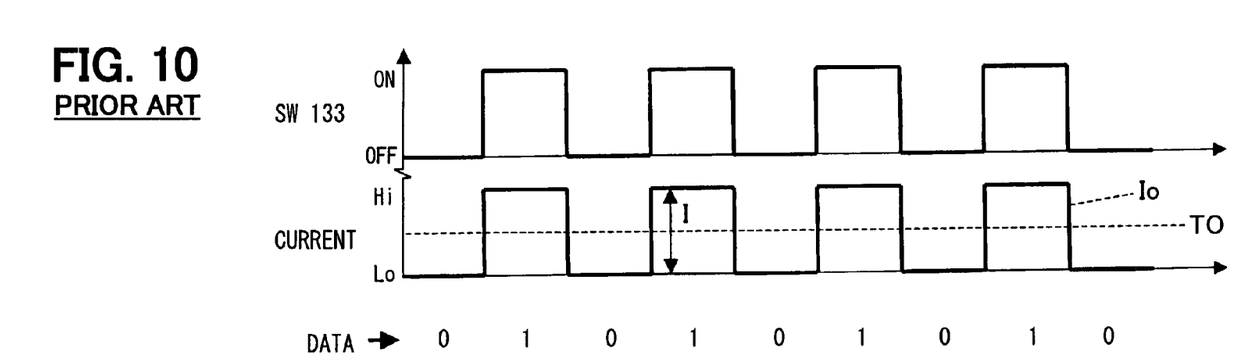
FIG. 10 is a signal diagram showing an operation of a current detection circuit shown in FIG. 9.

The microcomputer 121 includes a CPU, ROM, RAM, etc. as known well. With the CPU executing control programs stored in the ROM, the microcomputer 121 receives the digital signal of "1" and "0" based on the current detection result applied from the SPI circuit. More specifically, when the current Io detected by the current detection circuit 123 is higher and lower than a predetermined threshold level T0, the microcomputer 121 determines that the data is "1" and "0", respectively, as shown in FIG. 10. The microcomputer 121 thus determines a vehicle collision based on the received acceleration data (digital data) and controls an igniter circuit 126 when determining the vehicle collision.

In a vehicle, various electric noises are generated. The noises include an induction noise, which is induced by other electric devices in a vehicle and affects communications. The induction noise adversely affects by electromagnetic coupling or static coupling among wire harnesses extending in parallel when a current of each electric device changes during operation. Such a noise should not cause any error in communications in airbag control.

Figure 11:
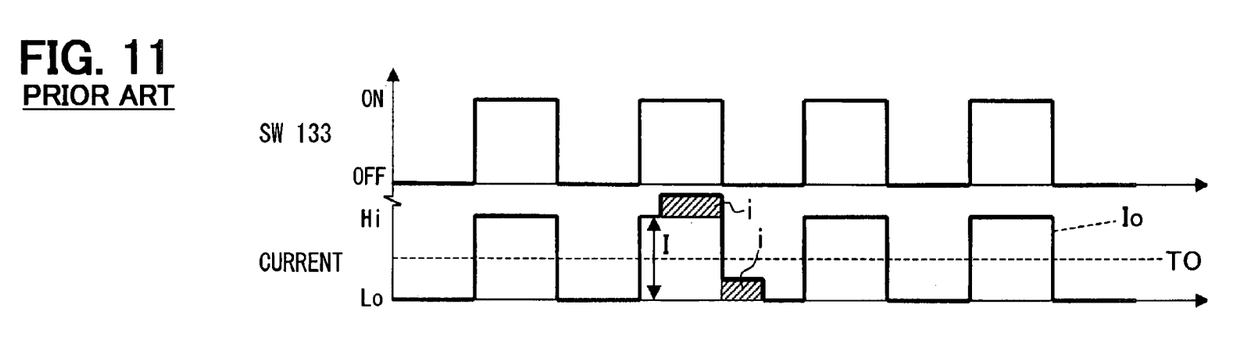
FIG. 11 is a signal diagram showing current detection in the case of superposition of induction noise in the conventional system.

In the conventional airbag activation system 101, however, the induced current and the communication current cannot be separated. Therefore, assuming that the communication current is I and the induced noise current is i as shown in FIG. 11, the current detection circuit 123 only detects a total current Io=I+i. As a result, even when no communication current flows, that is, I=0, the digital data is possibly determined as "1" when the induced current i becomes larger than the threshold level TO. This determination error may be eliminated by setting the communication current I to be larger than the induced current. However larger communication current has a limitation, because it must be set larger and larger as more and more large electric devices such as an electric motor that causes larger current changes are mounted in an electric motor-driven vehicle.

Figure 12:
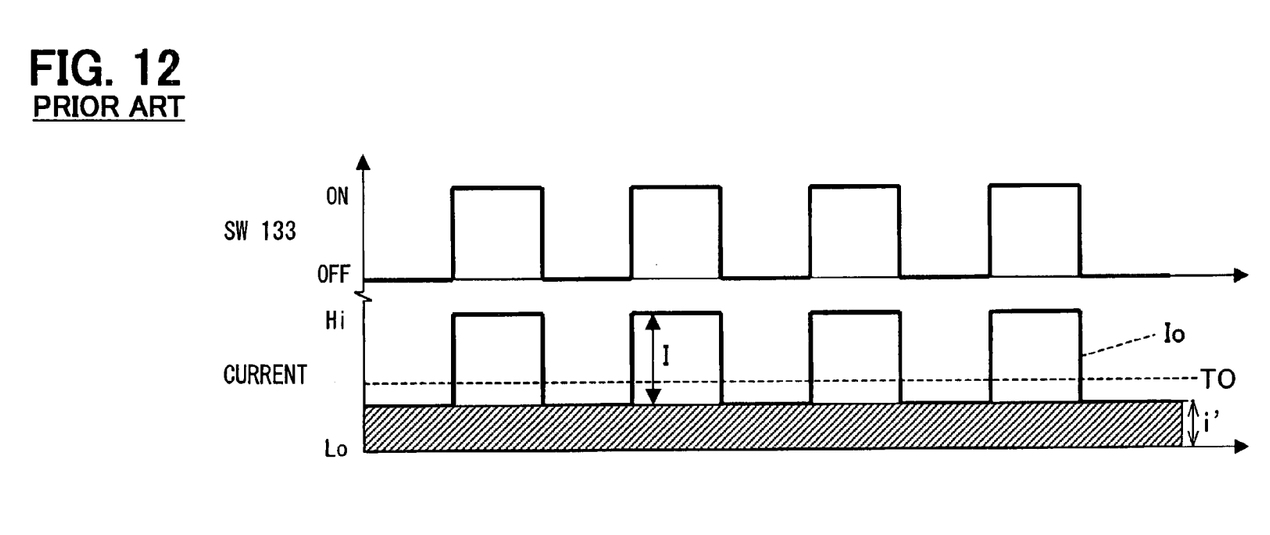
FIG. 12 is a signal diagram showing current detection in the case of failure in the communication line in the conventional system.

Further, when the communication line 104 is in failure, for instance accidentally shorted to the ground, the communication current I is shifted by an amount corresponding to a leak current i' as shown in FIG. 12. If the leak current i' reaches the threshold level TO, the microcomputer 121 cannot determine whether the data is "1" or "0," and hence cannot activate the airbag accurately.

SUMMARY OF THE INVENTION

It is therefore an object of the present invention to provide activation system and method for a passenger protection device, which performs a current communication method between a central unit and a satellite unit without being adversely affected by electric noises.

It is another object of the present invention to provide activation system and method for a passenger protection device, which detects failure in a communication line.

According to one aspect of the present invention, an activation system for a passenger protection device mounted in a vehicle comprises a pair of communication wires, a central unit connected to the communication wires for detecting currents flowing in the communication wires and controlling activation of the passenger protection device based on detected currents, and a satellite unit including a sensor and connected to the communication wires to be located away from the central unit. The satellite unit varies the currents flowing in the communication wires based on output data of the sensor. The central unit includes a pair of current detection circuits for detecting the currents in the communication wires, respectively, to detect the output data of the sensor based on both of the detected currents.

Preferably, the central unit calculates a sum of the detected currents and detects the output data of the sensor based on the sum of the detected currents by comparing the sum with a first predetermined level. The central unit calculates a difference between the detected currents and detects failure in the communication wires based on the difference between the detected currents by comparing the difference with a second predetermined level smaller than the first predetermined level.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
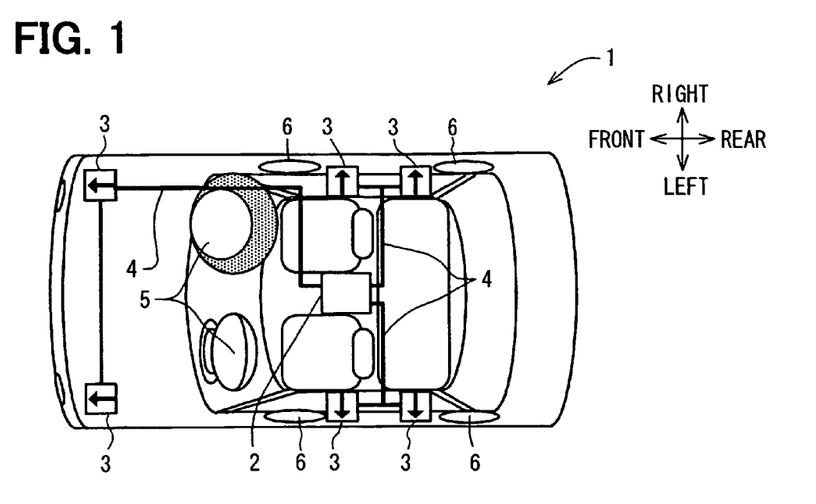
FIG. 1 is a schematic view showing an airbag activation system according to one embodiment of the present invention.

Referring first to FIG. 1, an airbag activation system 1 is mounted in a vehicle, in which a plurality of front airbags 5 and side airbags 6 are mounted as passenger protection devices. The front airbags 5 are for protecting passengers in the front seats from front collision, and the side airbags 6 are for protecting passengers in the front and rear seats from side collision. The system 1 includes a central airbag electronic control unit (ECU) 2, a plurality of collision sensor units 3 and a plurality of communication lines 4. The airbag ECU 2 is mounted in the center of the vehicle as a central unit. The sensor units 3 are distanced away from the airbag ECU 2 and mounted as satellite units at both left and right sides in the front area in correspondence to the front airbags 5, in the middle area (front seat area) and in the middle rear area (rear seat area) of the vehicle in correspondence to the side airbags 6. The communication lines 4 connect the sensor units 3 and the airbag ECU 2.

Figure 2:
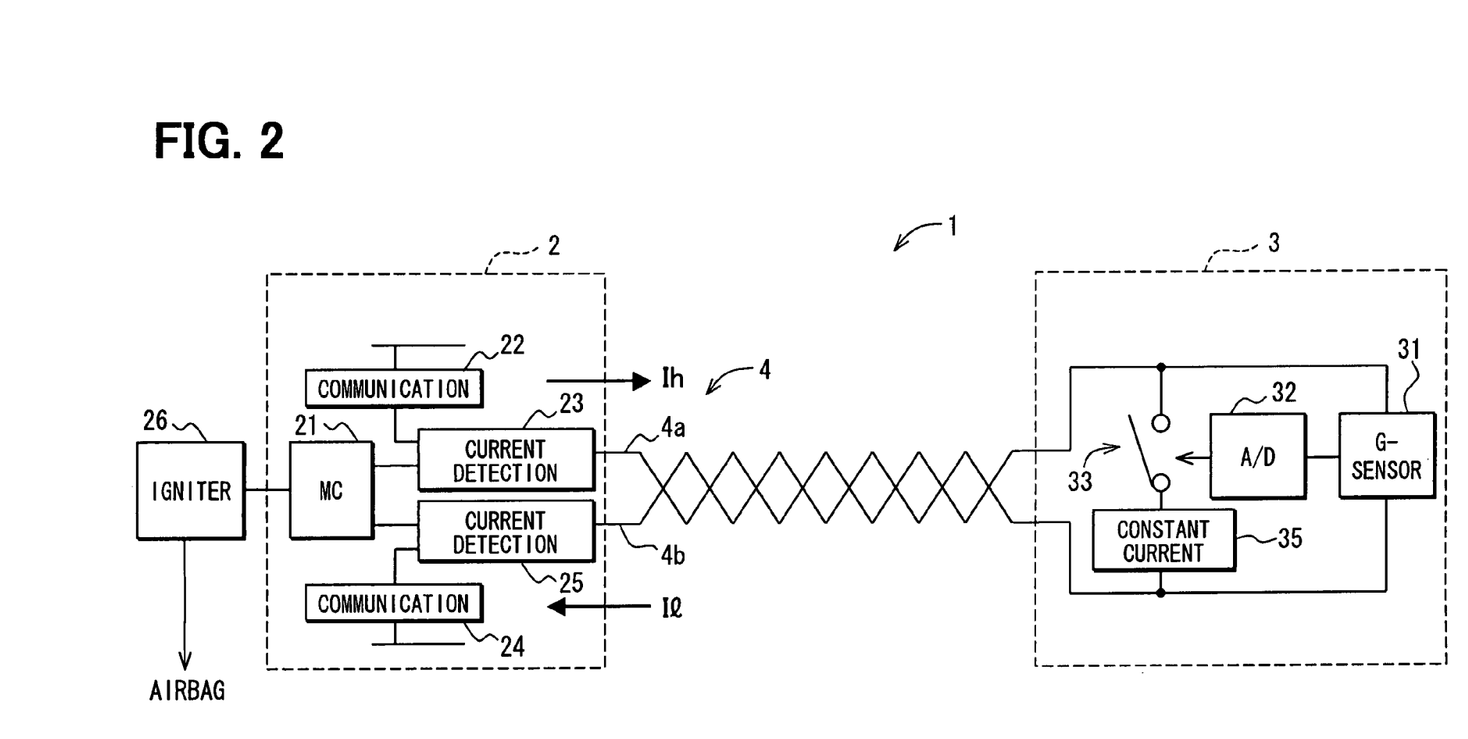
FIG. 2 is a block diagram showing the airbag activation system shown in FIG. 1.

The airbag activation system 1 is constructed as shown in FIG. 2, in which only one sensor unit 3 is shown. Other sensor units 3 may be connected to the airbag ECU 2 through respective communication lines 4 in the similar manner. Each communication line 4 may be a twisted-pair cables 4a, 4b for allowing a current to flow from the airbag ECU 2 to the sensor unit 3 and from the sensor unit 3 to the airbag ECU 2, respectively, as shown by arrows. With the communication line 4, the sensor unit 3 transmits data to the airbag ECU 2 based on the current communication method.

The sensor unit 3 includes a G-sensor 31, an analog/digital (A/D) converter 32, a communication switch 33 and a constant current circuit 35. The G-sensor 31 is an electronic acceleration sensor that detects acceleration (G) generated upon collision of the vehicle against an obstacle such as an on-coming vehicle and outputs an analog signal corresponding to the detected acceleration. The G-sensor 31 mounted at the front area of the vehicle detects acceleration applied in the longitudinal (front-rear) direction, while the G-sensor 31 mounted at the middle area or middle rear area detects acceleration in the lateral (left-right) direction.

The A/D converter 32 converts an analog signal of the G-sensor 31 to a corresponding digital signal indicative of the detected acceleration. The communication switch 33 may be a semiconductor switching element provided between the communication wires 4a, 4b, so that it may be turned on and off when the digital signal of the A/D converter 32 is "1" and "0", respectively.

The constant current circuit 35 is also provided between the communication cables 4a, 4b in series with the communication switch 33 to supply a constant current. When the communication switch 33 is turned on, the constant current supplied by the constant current circuit 35 flows in the direction indicated by arrows in FIG. 2. When the communication switch 33 is turned off, on the other hand, the constant current does not flow.

The airbag ECU 2 is an electronic control unit that determines vehicle collision based on data received from the sensor unit 3 through the communication line 4, and controls activation of the airbags 5 and/or 6. The airbag ECU 2 includes a microcomputer 21, a communication circuit 22, a current detection circuit 23, a communication circuit 24 and a current detection circuit 25. The communication circuit 22 is connected to the communication wire 4a through the current detection circuit 23, while the communication circuit 24 is connected to the communication wire 4b through the current detection circuit 25. The current detection circuit 23 is for detecting a current flowing in the communication wire 4a, while the current detection circuit 25 is for detecting a current flowing in the communication wire 4b. The communication circuits 22, 24 are for transmitting signals from the airbag ECU 2 to the sensor unit 3. Although not shown in the figure, the currents detected by the current detection circuits 23, 25 are transmitted to the microcomputer 21 through a serial peripheral interface (SPI) circuit.

The microcomputer 21 includes CPU, ROM, RAM, etc. as known well. With the CPU executing control programs stored in the ROM, the microcomputer 21 receives the digital signal of "1" and "0" based on the current detection results applied from the SPI circuit. More specifically, the microcomputer 21 receives a combination of digital signals of "1" and "0" and determines whether a vehicle collision has occurred based on the received acceleration data (digital data) and controls an igniter circuit 26 to activate the airbags 5 and/or 6, when determining the vehicle collision.

Figure 3:
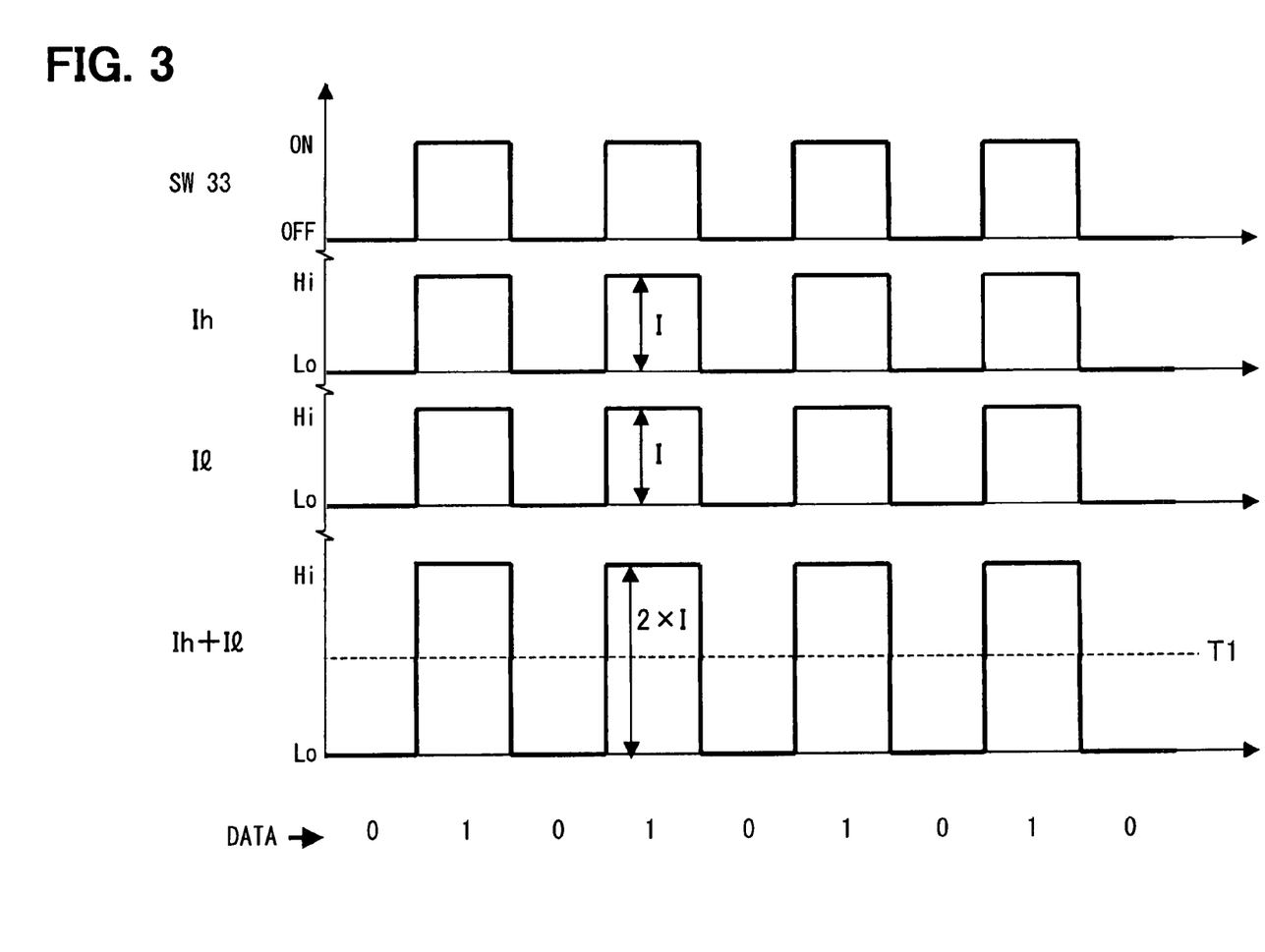
FIG. 3 is a signal diagram showing an operation of a current detection circuit shown in FIG. 2.

Further, in the operation of the airbag ECU 2, the current detection circuit 23 detects a current Ih, which flows in the communication wire 4a, and the current detection circuit 25 detects a current Il, which flows in the communication wire 4b. The currents Ih and Il change as shown in FIG. 3 in response to an ON/OFF change in the communication switch 33. As long as no failure occurs in the airbag activation system 1, the currents Ih and Il are equal to a fixed current I and a sum of the currents Ih+Il becomes 2I. The microcomputer 21, particularly the CPU, executes failure detection processing shown in FIG. 4 by using the normal operation characteristic shown in FIG. 3.

Figure 4:
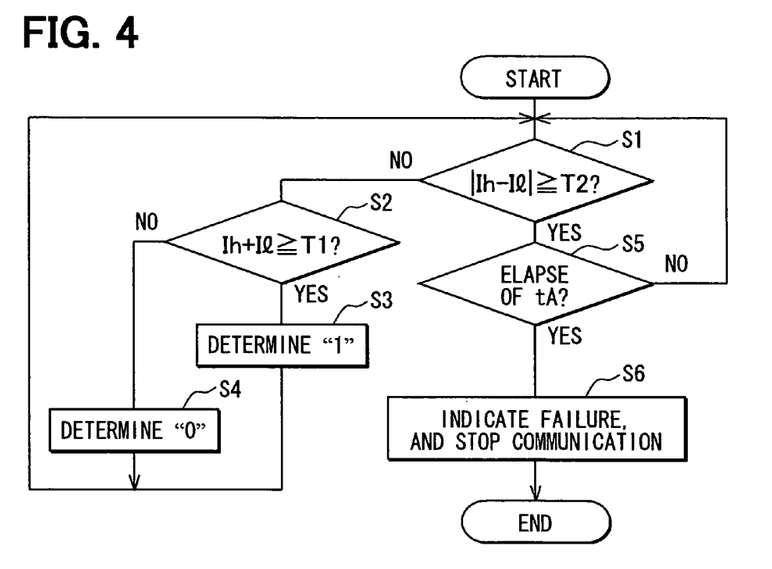
FIG. 4 is a flow diagram showing data receiving processing of a microcomputer shown in FIG. 2.

Specifically, the microcomputer 21 calculates at step S1 an absolute value of difference |Ih−Il| by subtracting the current Il from the current Ih and checks whether the difference is equal to or larger than a second predetermined threshold level T2, which is set as a reference for detecting failure. If the difference is smaller than T2, the microcomputer 21 calculates at step S2 a sum of the currents Ih and Il and checks whether the sum is equal to or larger than a first predetermined threshold level T1. T1 may be set to about 1 as shown in FIG. 3. If the sum is equal to or larger than T1, the microcomputer 21 determines that received data is "1" at step S3 and repeats step S1 again. If the sum is smaller than T1, the microcomputer 21 determines that the received data is "0" at step S4 and repeats step S1 again.

If the difference |Ih−Il| is larger than T2 at step S1, on the other hand, the microcomputer 21 determines at step S5 that the airbag activation system 1 is not normal and checks whether a predetermined time tA has elapsed after the difference became larger than T2, that is, the difference continues to be larger than T2 for more than tA. The second predetermined level T2 is set to be smaller than the first predetermined level T1. If the time elapse is not more than tA, the microcomputer 21 repeats step S1 again. If the time elapse is equal to or more than tA, the microcomputer 21 indicates failure in the airbag activation system 1 by turning on a failure indicator light or issuing a warning. The microcomputer 21 also stops the communication with the sensor unit 3 at step S6.

Figure 5:
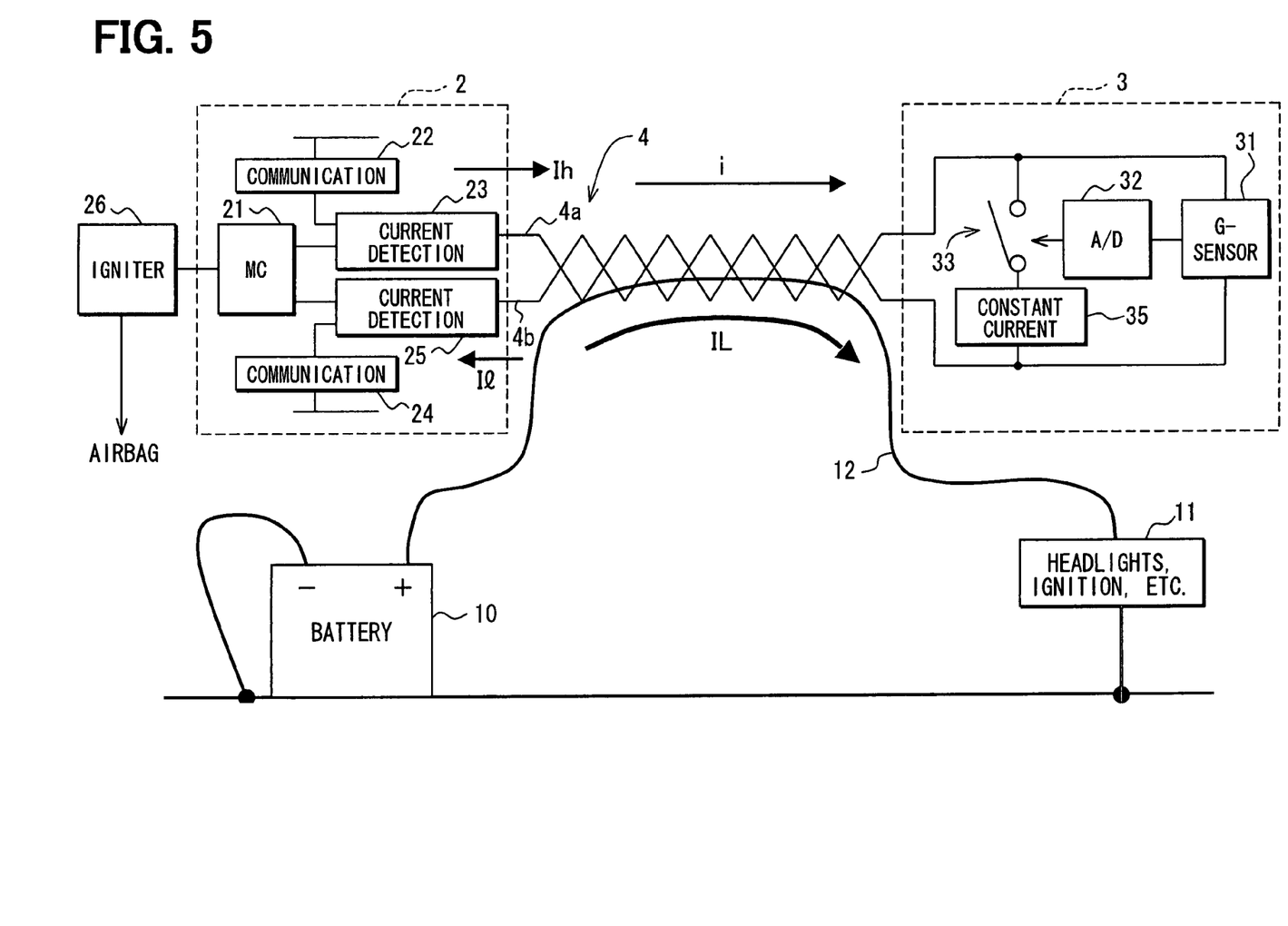
FIG. 5 is a block diagram showing mechanism of generation of an induction noise.
Figure 6:
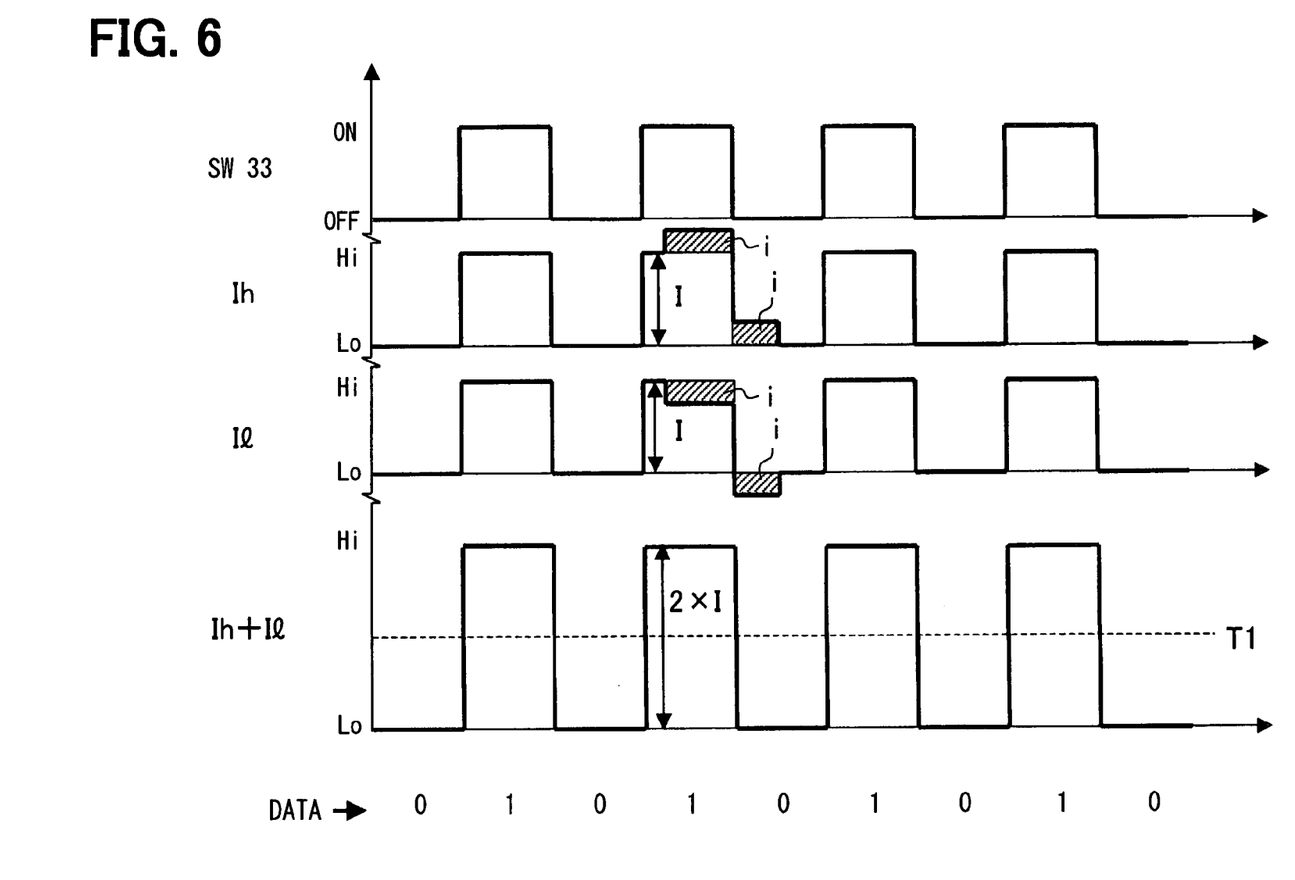
FIG. 6 is a signal diagram showing current detection in the case of superposition of the induction noise shown in FIG. 5.

In the vehicle, various electric devices 11 such as an engine spark igniter or headlights cause a large change in load current IL supplied from a storage battery 10 through a power cable 12 as shown in FIG. 5. If the power cable 12 runs in parallel with the communication line 4, this load current change induces noise current (induction noise) i in the same direction in the communication wires 4a, 4b. Thus, as shown in FIG. 6, the noise current i is in the same direction as one of the currents Ih and Il, and it is in the opposite direction as the other of the currents Ih and Il. This noise current i can be therefore cancelled out by adding the two currents Ih and Il, for instance Ih+Il=(I+i)+(I−i), or Ih+Il=(I−i)+(I+i). In this embodiment, therefore, the data "1" or "0" can be determined accurately based on the sum of the currents Ih+Il at step S2 in FIG. 4 without being adversely affected by the noise current i.

Figure 7:
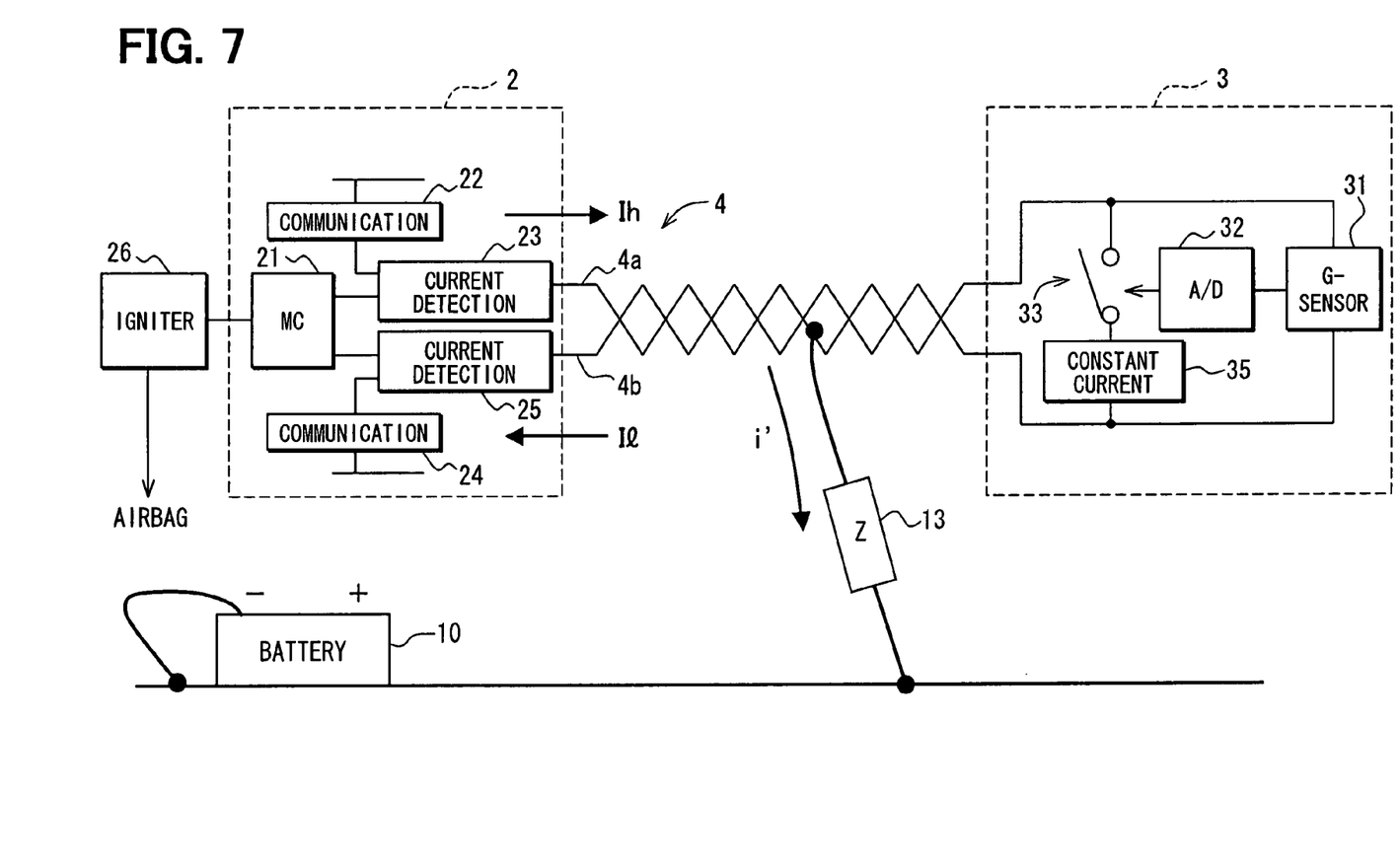
FIG. 7 is a block diagram showing mechanism of generation of failure in a communication lie.
Figure 8:
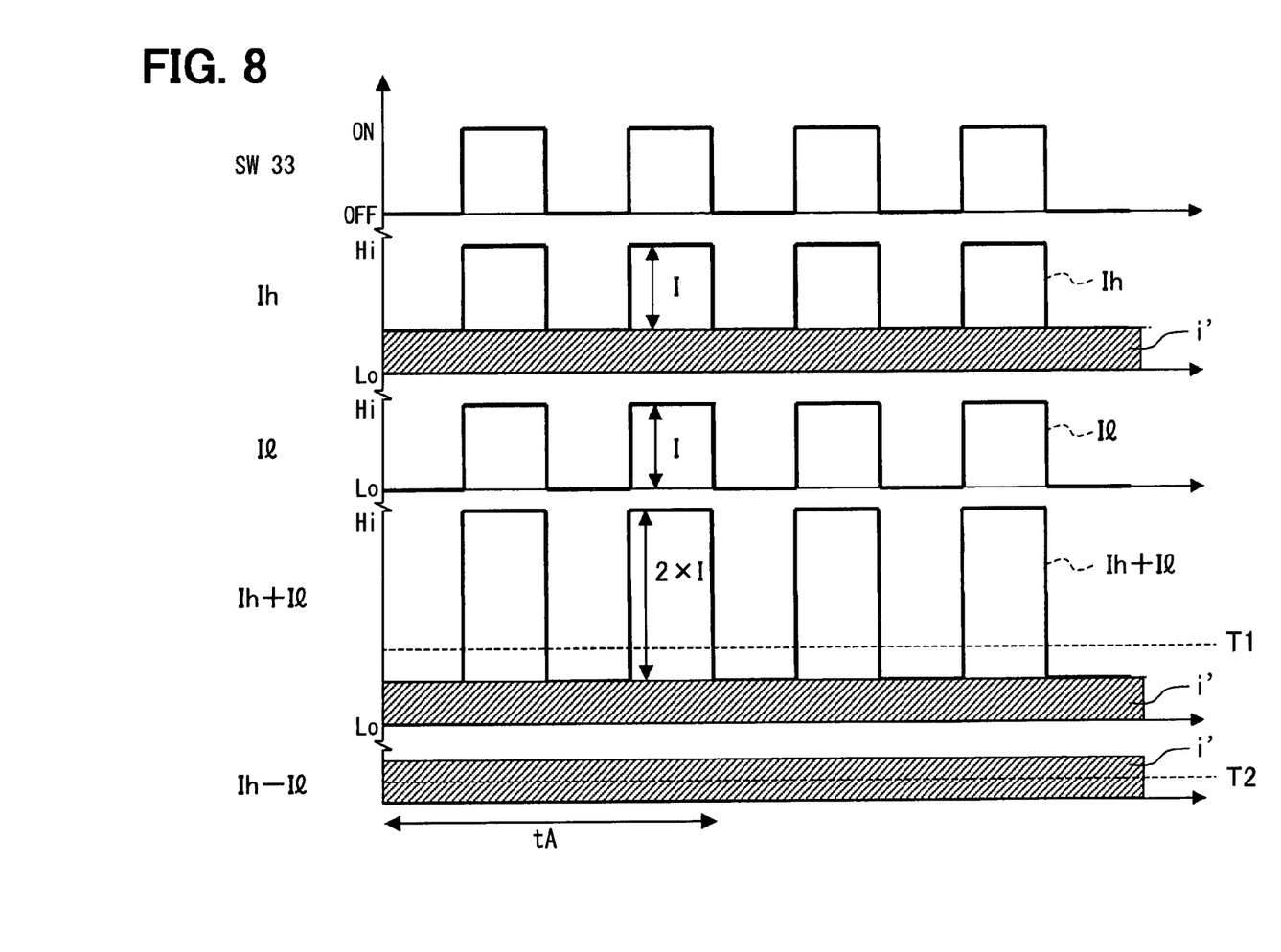
FIG. 8 is a signal diagram showing current detection in the case of failure shown in FIG. 7.

If the communication wire 4a is accidentally shorted to the ground through a certain impedance 13 as shown in FIG. 7, a leak current i' flows through the impedance 13. In this failure case, the current Ih is shifted to be larger than the normal current I by the leak current i', that is Ih=I+i'. If the leak current i' reaches the threshold level T1, the microcomputer 21 cannot accurately determine whether the data is "1" or "0" even if determination is made based on the sum of currents Ih+Il. In the case of failure in the communication line 4, it is impossible to perform communication normally but it is desired to detect and indicate such a failure accurately.

According to the embodiment, therefore, the difference |Ih−Il| between the currents Ih and Il is calculated at step S1 in FIG. 4. In this case, since Ih=I+i' and Il=I, the difference |Ih−Il| equals i', which is the leak current caused by failure. This failure will not normally disappear very soon. Therefore, in this embodiment, the microcomputer 21 checks at step S5 whether the failure continues for more than the time tA, and indicates the failure and stops the communication with the sensor unit 3 at step S6 so that the airbag will not be activated erroneously.

As described above, the currents flowing in the communication wires 4a, 4b are varied in accordance with the acceleration detected by the G-sensor 31, and the currents Ih and Il in the communication wires 4a, 4b detected by the current detection circuits 23, 25 are used to control activation of the airbags 5, 6. By calculating a sum of the currents Ih and Il, the induction noise i can be cancelled out, and hence the data transmitted from the sensor unit 3 can be accurately detected without being affected by the induction noise. Further, by calculating a difference between the currents Ih and Il, only the leak current i' that is an abnormal current can be detected, and hence failure in the communication line 4 can be detected surely.

Although the above embodiment is directed to the airbag activation system 1, in which the central airbag ECU 2 is connected to the collision sensor units 3, it may be modified to any passenger protection system, in which a central ECU for controlling activation of a passenger protection device is connected to other satellite units for detecting a roll-over of a vehicle by a roll rate detection sensor, presence/absence of passengers in the vehicle by a passenger detection sensor, pressure in a door of the vehicle by a pressure detection sensor.

What is claimed is:

1. An activation system for a passenger protection device mounted in a vehicle, the system comprising:
   a pair of communication wires;
   a central unit connected to the communication wires for detecting currents flowing in the communication wires and controlling activation of the passenger protection device based on detected currents; and
   a satellite unit including a sensor and connected to the communication wires to be located away from the central unit, the satellite unit varying the currents flowing in the communication wires based on output data of the sensor,
   wherein the central unit includes a pair of current detection means connected to the pair of communication wires for detecting the currents in the communication wires, respectively, to detect the output data of the sensor based on the detected currents, and
   wherein one of the pair of current detection means is provided to detect a current, which flows from the central unit to the satellite unit through one of the pair of communication wires, and the other one of the pair of current detection means is provided to detect a current, which flows from the satellite unit to the central unit through the other one of the pair of communication wires.

2. The activation system according to claim 1, wherein the central unit calculates a sum of the detected currents and detects the output data of the sensor based on the sum of the currents.

3. The activation system according to claim 1, wherein the central unit calculates a difference between the detected currents and detects failure in the communication wires based on the difference between the detected currents.

4. The activation system according to claim 3, wherein the central unit detects the failure when the difference between the detected currents continues to be larger than a predetermined level for more than a predetermined time.

5. The activation system according to claim 1, wherein the sensor of the satellite unit is a collision detection sensor for detecting at least one of collisions of the vehicle at a front area and a side area.

6. The activation system according to claim 1, wherein the sensor of the satellite unit is a roll rate detection sensor for detecting a roll-over of the vehicle.

7. The activation system according to claim 1, wherein the sensor of the satellite unit is a passenger detection sensor for detecting a passenger in the vehicle.

8. The activation system according to claim 1, wherein the sensor of the satellite unit is a pressure detection sensor provided within a door of the vehicle for detecting a pressure within the door, which changes upon collision of the vehicle.

9. The activation system according to claim 2, wherein the central unit compares the sum of the currents with a first predetermined level to detect the output data of the sensor.

10. The activation system according to claim 9, wherein the central unit calculates a difference between the detected currents and compares the difference with a second predetermined level smaller than the first predetermined level to detect failure in the communication wires.

11. An activation method for a passenger protection device mounted in a vehicle, the method comprising:
    detecting a predetermined parameter by a sensor of a satellite unit;
    varying currents flowing through communication wires between a central unit and the satellite unit in accordance with an output of the sensor;
    detecting the currents flowing in the communication wires, the currents being a first current flowing from the central unit to the satellite unit through a first one of the communication wires and a second current flowing from the satellite unit to the central unit through a second one of the communication wires; and
    controlling activation of the passenger protection device based on the currents.

12. The activation method according to claim 11, wherein the controlling includes:
    calculating a sum of the currents; and
    comparing the sum with a first predetermined level to detect the output of the sensor.

13. The activation method according to claim 12, wherein the controlling includes:
    calculating a difference between the currents;
    comparing the difference with a second predetermined level, which is smaller than the first predetermined level to detect failure in the communication wires; and
    stopping the activation of the passenger protection device when the difference is larger than the second predetermined level.

14. The activation method according to claim 11, wherein the controlling includes:
    calculating a difference between the currents;
    comparing the difference with a predetermined level to detect failure in the communication wires; and
    stopping the activation of the passenger protection device when the difference is larger than the predetermined level.

* * * * *